United States Patent [19]

Ban

[11] 4,063,830

[45] Dec. 20, 1977

[54] LOCKABLE AND SEPARABLE PIVOTAL CONNECTOR JOINT

[76] Inventor: Stephan C. Ban, 9009 Mears St., Fairfax, Va. 22030

[21] Appl. No.: 709,354

[22] Filed: July 28, 1976

[51] Int. Cl.² .............................................. F16D 1/12
[52] U.S. Cl. ........................................ 403/3; 403/166; 135/15 PQ; 403/102
[58] Field of Search .................... 403/3, 53, 91, 102, 403/166, 292; 135/4 R, 7.1 R, 15 PQ; 248/160, 204, 276

[56] References Cited

U.S. PATENT DOCUMENTS

| 627,780 | 6/1899 | Meyer | 403/102 X |
|---|---|---|---|
| 1,534,820 | 4/1925 | Walmsley | 403/102 X |
| 2,133,692 | 10/1938 | Gittings et al. | 403/102 X |
| 2,475,406 | 7/1949 | Russell | 403/166 X |
| 2,720,405 | 10/1955 | Kennedy | 403/292 X |
| 3,448,748 | 6/1969 | Walrave | 135/4 R X |
| 3,556,549 | 1/1971 | Hershman | 403/102 X |

FOREIGN PATENT DOCUMENTS

| 24,016 of | 1895 | United Kingdom | 403/102 |

*Primary Examiner*—Wayne L. Shedd
*Attorney, Agent, or Firm*—Nathan Edelberg

[57] ABSTRACT

The disclosure relates to a connector joint that consists of separable elements that may be either locked in axial alignment or permitted to pivot relative to each other. The preferred embodiment disclosed utilizes a tubular receiving sleeve with a radius flared socket as one element and tubular pin carrying housing having a partially spherical head of a size corresponding to that of the sleeve.

4 Claims, 4 Drawing Figures

LOCKABLE AND SEPARABLE PIVOTAL CONNECTOR JOINT

The invention described herein may be manufactured, used and licensed by or for the Government for Govermental purposes without the payment to me of any royalties thereon.

This invention relates to separable and lockable pivotal connector joints, and more particularly to those joints used in collapsible shelter frames.

In recent years many tent-like shelters have been developed that may be collapsed into an easily transportable package with its components still interconnected, and then expanded quickly back into a shelter in anew location. Two such shelters are described in U.S. Pat. Nos. 3,223,098 and 3,448,748. In these prior art shelters, tubular self-aligning structures are held together by flexible strands such as bungee cord or springs. Ends of adjacent tubular elements generally are designed so as to telescopically interconnect with the bungee cord coaxially passing through them under tension to hold the elements together. When the elements interconnect, a tubular sleeve carried by one of the elements slides down over the joint making it immobile. To collapse the structure, the sleeves are slid off the interconnection and then the elements are jackknifed into a bundle. In collapsing the structure by folding about pivotal axes provided by the bungee cord, the cord is stretched and placed under greater tension resulting in a propensity of the structure toward reassembling itself. While this tendency is desirous from the standpoint that the ability of the structure to virtually reassemble itself makes erection simple and easy, it causes real problems when breaking down the structure. Since there are numerous connections that must be broken down on each side of the structure, as the user breaks down one side, the other side frequently redeploys itself.

Accordingly, it is an object of this invention to provide a pivotal connector joint that can automatically lock the frame structure into a rigid mode upon assembly, but can be caused to become completely flexible to allow for the collapse of the total structure without the aforenoted problem.

In carrying out this invention, a simple connector joint is formed of three basic parts: a receiving sleeve, a pin housing and a locking pin. The receiving sleeve, in use, would be carried by one structural member, while the locking pin and pin housing would be carried by another structural element to which the first is to be joined. The elastic or bungee cord would pass through all of these components to serve as both securing mechanism and part of the pivot axis. The sleeve and housing have complementary spherical surfaces that enable pivotal movement of one element with respect to the other when the pin is secured within the pin housing, while a rigid connection can be formed by extending the pin from the pin housing into the receiving sleeve.

Further objects and a better understanding of the invention may be had with reference to the detailed description and accompanying drawings wherein.

Figure 1:
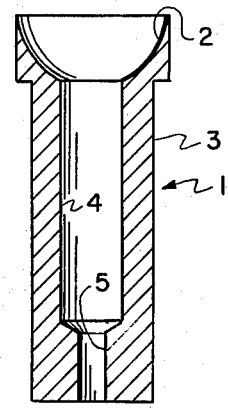
FIG. 1 is a vertical sectional view of the receiving sleeve of the preferred embodiment of the invention.
Figure 4:
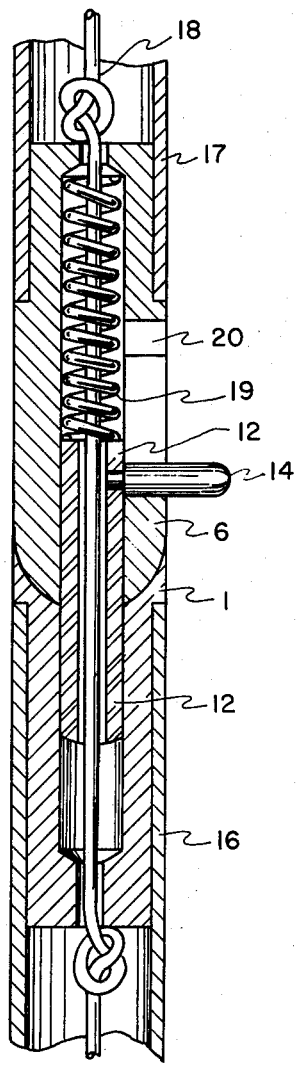
FIG. 4 is a partial sectional view of the preferred embodiment of the invention, in its rigid mode, joining two tubular structural elements.

Referring now to the drawings, FIGS. 1 and 4 depict a receiving sleeve 1 having a radius flare socket 2 at one end. The radius should preferably correspond to one half the outside diameter of the tubular element in which it is to be attached. A simple means of attachment can be achieved by providing the sleeve with a body portion 3 of reduced diameter, sized so as to snugly fit within the tubular element 16. The receiving sleeve 1 is also provided with an axial passage, extending from the radius socket 2 to the distal end, that has a portion 4 of a diameter that allows the locking pin 12 to move easily back and forth therein, and a portion 5 of a size corresponding to the outside diameter of the spring, elastic, or bungee cord to be used.

Figure 2:
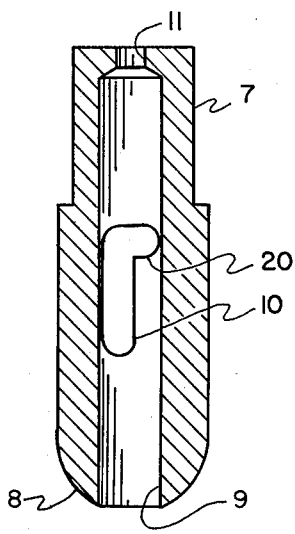
FIG. 2 is a side elevation of the pin housing of the preferred embodiment of the invention.

FIG. 2 illustrates a form of pin housing 6 in accordance with the invention. The housing 6 has a partially spherical head 8 having a radius corresponding to that of sleeve 1 and a diameter preferably the same as the outside diameter of tubular element 17. The housing is made securable to element 17 by providing body portion 7 with a section having an outside diameter that will fit snugly therein. The housing 6 is also provided with an axial passage 9 sized to permit free movement of pin 12 and having a pin locking slot 10 as well as a cord guiding slot 11 of reduced diameter.

Figure 3:
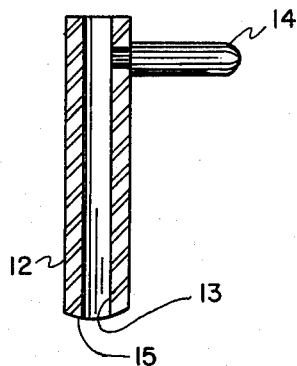
FIG. 3 is vertical sectional view of the locking pin of the preferred embodiment of the invention.

The third element of the connector joint is the retractable locking pin 12 shown in FIG. 3. The pin 12 is provided with a passage 13 for the bungee cord and a projecting trigger handle 14 which extends through slot 10 of the housing 6 when the joint is assembled. The end of the pin 15 is rounded with the same curvature as the head 8 so that when the pin is retracted flush therewith a smooth pivoting surface will exist.

The operation of the connector joint will now be apparent with reference to FIG. 4 which shows tubular element 16 rigidly connected to element 17 by the pin 12 which is projected into passage 4 of sleeve 1 by spring 19 which is located within the passage 9 of the housing 6 carried by tubular element 17.

To break down the frame made of elements 16 and 17 trigger handle 14 is moved along slot 10 into notch 20 thereby withdrawing in 12 from the sleeve 1. After all of the other connections in the structure have similarly been made flexible, element 17 may be pivoted with respect to element 16 about the axis formed by the head 8, socket 2 and cord 18. To reassemble the connection, the trigger 14 is removed from notch 20 so that upon element 17 coming into axial alignment with element 16, pin 12 will automatically relocate itself in passage 4.

It is noted that while one embodiment has described, numerous modifications and arrangements may be substituted without departing from the inventive concept as defined by the appended claims. For example, while a coil spring 19 has been shown, other types of springs or mere gravity actuation may be utilized. Likewise, instead of the latch 14 engaging a notch to lock pin 12, other detents such as a spring headed pin or a sliding lock (as is commonly used on umbrellas) can be utilized. Furthermore, while the joint has been shown in use with a continuous cord, the invention can be readily adapted to "building block" techniques by utilization of preassembled joints which include a short bungee cord extending from passage 5 to passage 11, the cord holding the unit together by being tied into a knot just exteriorly adjacent the outlet of each of these passages.

Accordingly, it can be seen that this invention provides a simple connector joint that can function as a rigid joint or a pivot joint thereby facilitating assembly and disassembly of structural frames without the disadvantage of inadvertent redeployment attendant to the connection joints previously used in structures utilizing flexible bungee cord type retaining devices.

I claim:

1. A hollowed connector joint for the rigid interconnection of a plurality of pole sections of the bungee cord variety wherein the hollow within said connector joint has a selected axial allignment common to the elemental pieces thereof when said pole sections are rigidly interconnected in a selected orientation of interconnected pole sections, and wherein a flexible resilient cord member of substantially uniform cross section is attached at opposite ends of the pole section assembly, said cord is normally under tension and said cord is threaded through said pole sections and through said hollowed connector joint, comprising:

a two piece connector joint assembly wherein first and second pieces are adapted for separation and for mating relation, and wherein the hollow within said first and second pieces of said connector joint assembly has a substantially uniform cross section, and;

a rigid tubular member disposed within the hollow of said connector joint assembly with said flexible cord member threaded therethrough;

said tubular member having a respective hollow configuration of uniform cross section compatible with said uniform cross section of said cord member and larger in dimensions with respect thereto such that said cord member is free to move within said tubular member;

said tubular member having an outer configuration compatible with the configuration of the cross section of the hollow within said connector joint assembly and smaller in dimensions with respect thereto such that said tubular member is moveable in contiguous relation within the hollow of said connector joint assembly when said pole sections are selectively oriented with respect each other such that the hollows in each of said first and second pieces of said joint assembly are in axial alignment;

said tubular member including restraint means adapted to limit the travel of said tubular member within said hollow of said connector joint assembly such that in a first position said tubular member is completely contained within one piece of said joint assembly and in a second position said tubular member is within both of said pieces of said connector joint assembly.

2. A hollowed connector joint as defined in claim 1 wherein said two piece connector joint assembly is a ball and socket joint assembly.

3. A hollowed connector joint as defined in claim 2 wherein said one piece of said joint assembly which completely contains said tubular member in said first position includes an axially extending slot with a transverse notch at the end most remote from the other piece of said joint assembly and said tubular member includes a projection therefrom which is adapted for movement within said slot and said notch, said notch adapted to retain said tubular means in said first position when said projection is in said notch.

4. A hollowed connector joint as defined in claim 3 wherein said joint assembly includes means for biasing said tubular member such that when said projection is in said slot said tubular member is in said second position.

* * * * *